(12) United States Patent
Liu et al.

(10) Patent No.: US 11,977,408 B2
(45) Date of Patent: May 7, 2024

(54) MULTIMEDIA SYSTEM AND MULTIMEDIA OPERATION METHOD

(71) Applicant: Wistron Corporation, New Taipei (TW)

(72) Inventors: Han-Yi Liu, New Taipei (TW); Chang-Hsin Lai, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 17/714,087

(22) Filed: Apr. 5, 2022

(65) Prior Publication Data

US 2023/0244267 A1 Aug. 3, 2023

(30) Foreign Application Priority Data

Jan. 28, 2022 (TW) .................................. 111103856

(51) Int. Cl.
| | |
|---|---|
| G06F 1/16 | (2006.01) |
| G06F 3/16 | (2006.01) |
| H04R 3/12 | (2006.01) |
| H04R 5/04 | (2006.01) |
| H04S 7/00 | (2006.01) |

(52) U.S. Cl.
CPC ............ *G06F 1/1605* (2013.01); *G06F 3/162* (2013.01); *H04R 3/12* (2013.01); *H04R 5/04* (2013.01); *H04S 7/30* (2013.01); *H04S 7/40* (2013.01); *H04R 2430/01* (2013.01); *H04R 2499/15* (2013.01); *H04S 2400/11* (2013.01); *H04S 2400/13* (2013.01)

(58) Field of Classification Search
None
See application file for complete search history.

(56) References Cited

U.S. PATENT DOCUMENTS

| | | | |
|---|---|---|---|
| 10,074,012 B2* | 9/2018 | Zhou ....................... | H04N 9/802 |
| 10,542,366 B1* | 1/2020 | Oates, III ................. | H04R 5/02 |
| 10,666,920 B2* | 5/2020 | Lindahl ............ | H04N 21/41407 |
| 11,363,328 B2* | 6/2022 | Choi ........................ | H04R 5/00 |
| 2022/0174445 A1* | 6/2022 | So ........................... | H04S 3/008 |
| 2023/0075878 A1* | 3/2023 | Zhang .................... | H04R 1/403 |

* cited by examiner

*Primary Examiner* — Paul W Huber
(74) *Attorney, Agent, or Firm* — JCIPRNET (57) ABSTRACT

A multimedia system and a multimedia operation method are provided. The multimedia system includes a signal encoder, a screen, multiple loudspeakers, a processor, and an amplifier circuit. The signal encoder encodes an image signal, an audio signal, and an audio enhancement signal to provide a multimedia signal. The image signal is divided into multiple regional image signals based on multiple display regions. The audio signal includes multiple regional audio signals corresponding to the regional image signals. The processor extracts the image signal, the regional audio signals, and the audio enhancement signal from the multimedia signal and controls the screen to display the image signal. The amplifier circuit adjusts the regional audio signals in response to the audio enhancement signal and provides the adjusted regional audio signals to the loudspeakers.

17 Claims, 6 Drawing Sheets

MULTIMEDIA SYSTEM AND MULTIMEDIA OPERATION METHOD

CROSS-REFERENCE TO RELATED APPLICATION

This application claims the priority benefit of Taiwan application serial no. 111103856, filed on Jan. 28, 2022. The entirety of the above-mentioned patent application is hereby incorporated by reference herein and made a part of this specification.

BACKGROUND

Technical Field

The disclosure relates to a multimedia system and a multimedia operation method, and more particularly to a multimedia system and a multimedia operation method with improved sound source synchronization effect.

Description of Related Art

A multimedia playback device generally includes a screen and at least one loudspeaker which plays audio signals. However, in a certain region displayed by the screen, there may be sound effects or voices that need to be highlighted. The existing audio playback method cannot highlight sound effects or voices in a specific region. Therefore, it is necessary to improve sound source synchronization effect of the existing multimedia playback device.

SUMMARY

The disclosure provides a multimedia system and a multimedia operation method with improved sound source synchronization effect.

An embodiment of the disclosure discloses a multimedia system including a signal encoder, a screen, multiple loudspeakers, a processor, and an amplifier circuit. The signal encoder encodes an image signal, an audio signal, and an audio enhancement signal to provide a multimedia signal. The image signal is divided into multiple regional image signals based on multiple display regions. The audio signal includes multiple regional audio signals corresponding to the regional image signals. The screen has the display regions. The processor is coupled to the screen. The processor extracts the image signal, the regional audio signals, and the audio enhancement signal from the multimedia signal and controls the screen to display the image signal. The amplifier circuit is coupled to the processor and the loudspeakers. The amplifier circuit receives the regional audio signals and the audio enhancement signal, adjusts the regional audio signals in response to the audio enhancement signal, and provides the adjusted regional audio signals to corresponding ones among the loudspeakers.

An embodiment of the disclosure discloses a multimedia operation method adapted for a multimedia system. The multimedia system includes a screen and multiple loudspeakers. The multimedia operation method includes the following steps. An image signal, an audio signal, and an audio enhancement signal are encoded to provide a multimedia signal. The image signal is divided into multiple regional image signals based on multiple display regions of the screen, and the audio signal includes multiple regional audio signals corresponding to the regional image signals. The image signal, the regional audio signals, and the audio enhancement signal are extracted from the multimedia signal. The screen is controlled to display the image signal. By an amplifier circuit, the regional audio signals are adjusted in response to the audio enhancement signal, and the adjusted regional audio signals are provided to corresponding ones among the loudspeakers.

Based on the above, the disclosure adds the audio enhancement signal to the multimedia signal. The regional image signals correspond to the regional audio signals. Therefore, the amplifier circuit may adjust the regional audio signals in response to the audio enhancement signal and provide the adjusted regional audio signals to the corresponding loudspeaker among the loudspeakers, enabling the loudspeakers to highlight sound effects or voices in a specific region. In this way, the disclosure may improve sound source synchronization effect.

In order to make the aforementioned features and advantages of the disclosure comprehensible, embodiments accompanied with drawings are described in detail below.

DESCRIPTION OF THE EMBODIMENTS

Part of the embodiments of the disclosure will be described in detail below with accompanying drawings. For the reference numerals used in the following description, the same reference numerals appearing in different drawings will be regarded as the same or similar elements. These embodiments are only a part of the disclosure and do not disclose all possible implementations of the disclosure. More precisely, these embodiments only serve as examples within the scope of the claims of the disclosure.

Figure 1:
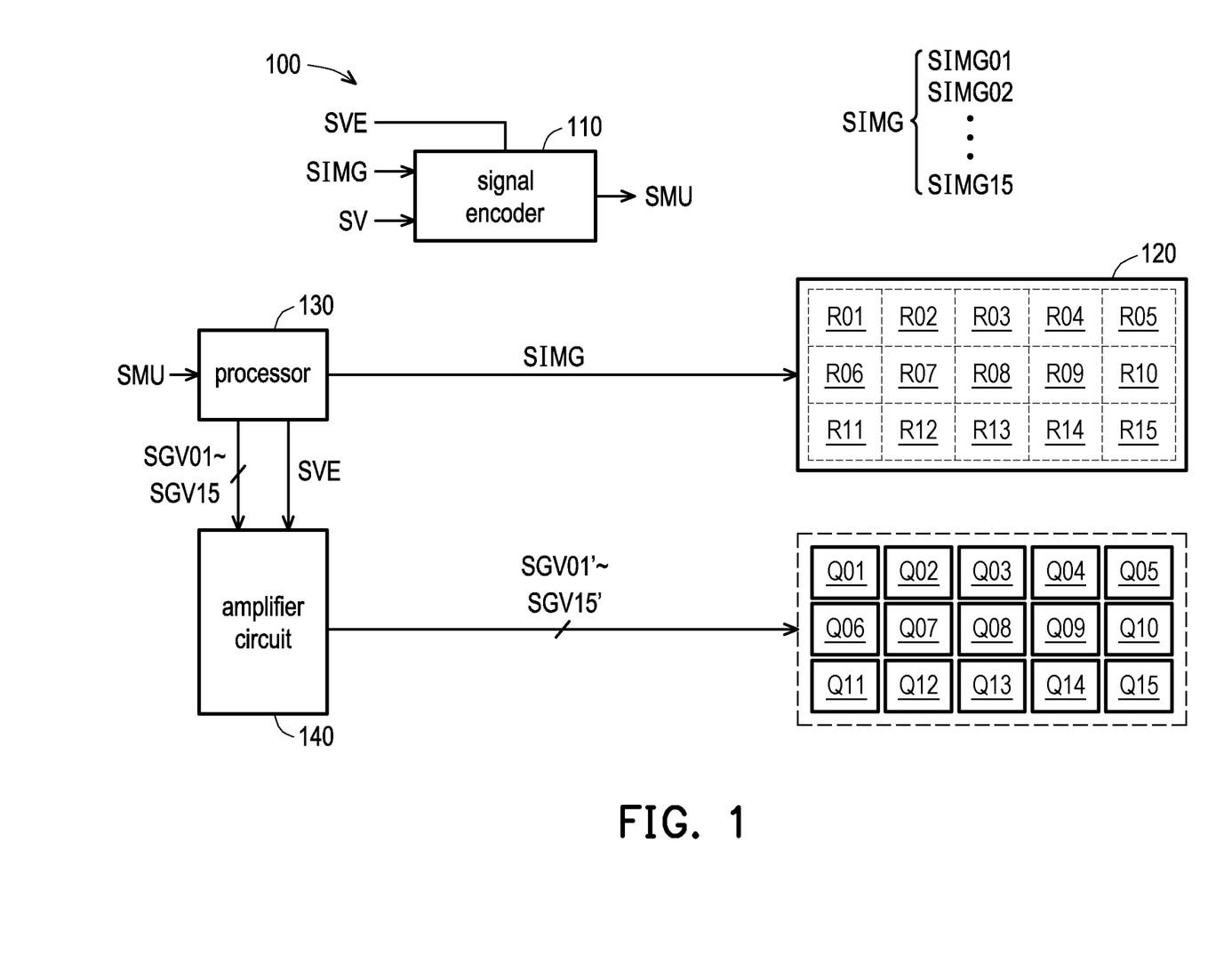
FIG. 1 is a schematic diagram of a multimedia system according to an embodiment of the disclosure.

Please refer to FIG. 1. FIG. 1 is a schematic diagram of a multimedia system according to an embodiment of the disclosure. In an embodiment, a multimedia system 100 includes a signal encoder 110, a screen 120, loudspeakers Q01 to Q15, a processor 130, and an amplifier circuit 140. The signal encoder 110 encodes an image signal SIMG, an audio signal SV, and an audio enhancement signal SVE to provide a multimedia signal SMU. The multimedia signal SMU is, for example, a multimedia data string. The signal encoder 110 may combine the image signal SIMG, the audio signal SV, and the audio enhancement signal SVE into a multimedia data string. In an embodiment, the image signal SIMG is divided into multiple regional image signals based on multiple display regions. For example, based on requirements of use, the image signal SIMG is divided according to 15 display regions R01 to R15 on the screen 120, but the disclosure is not limited thereto. Therefore, the image signal SIMG is divided into 15 regional image signals SIMG01 to SIMG15. The audio signal SV includes regional audio signals SGV01 to SGV15. The regional audio signals SGV01 to SGV15 correspond to the regional image signals SIMG01 to SIMG15. In an embodiment, the loudspeakers Q01 to Q15 correspond to the display regions R01 to R15, which means the number of the loudspeakers Q01 to Q15 is the same as the number of the display regions R01 to R15. For example, the loudspeaker Q01 corresponds to the display region R01, the loudspeaker Q02 corresponds to the display region R02, and so on, but the disclosure is not limited thereto. In an embodiment, the loudspeakers Q01 to Q15 are arranged as an array. In some embodiments, some of the loudspeakers Q01-Q15 are arranged to surround the screen 120. However, the disclosure is not limited to an arrangement of the loudspeakers Q01 to Q15 of an embodiment.

In an embodiment, the processor 130 is coupled to the screen 120 and the signal encoder 110. The processor 130 receives the multimedia signal SMU from the signal encoder 110. The processor 130 extracts the image signal SIMG, the regional audio signals SGV01 to SGV15, and the audio enhancement signal SVE from the multimedia signal SMU. The processor 130 provides the image signal SIMG to the screen 120 to control the screen 120 to display the image signal SIMG. Further, the processor 130 controls the screen 120. The screen 120 displays the regional image signal SIMG01 among the image signals SIMG in the display region R01, displays the regional image signal SIMG02 among the image signals SIMG in the display region R02, and so on.

In an embodiment, the amplifier circuit 140 is coupled to the processor 130 and the loudspeakers Q01 to Q15. The amplifier circuit 140 receives the regional audio signals SGV01 to SGV15 and the audio enhancement signal SVE. The amplifier circuit 140 adjusts the regional audio signals SGV01 to SGV15 in response to the audio enhancement signal SVE to generate adjusted regional audio signals SGV01' to SGV15'. The amplifier circuit 140 provides the adjusted regional audio signals SGV01' to SGV15' to corresponding ones among the loudspeakers Q01 to Q15.

For example, the amplifier circuit 140 adjusts the strength (i.e., volume) of the regional audio signal SGV01 in response to the audio enhancement signal SVE to generate the adjusted regional audio signal SGV01', and provides the adjusted regional audio signal SGV01' to the loudspeaker Q01. Therefore, the loudspeaker Q01 plays the adjusted regional audio signal SGV01'. The amplifier circuit 140 adjusts the strength of the regional audio signal SGV02 in response to the audio enhancement signal SVE to generate the adjusted regional audio signal SGV02', and provides the adjusted regional audio signal SGV02' to the loudspeaker Q02. Therefore, the loudspeaker Q02 plays the adjusted regional audio signal SGV02', but the disclosure is not limited thereto.

It should be noted that the multimedia system 100 adds the audio enhancement signal SVE to the multimedia signal SMU. The regional image signals SIMG01 to SIMG15 correspond to the regional audio signals SGV01 to SGV15. The amplifier circuit 140 may adjust the regional audio signals SGV01 to SGV15 in response to the audio enhancement signal SVE and correspondingly provide the adjusted regional audio signals SGV01' to SGV15' to the loudspeakers Q01 to Q15. Therefore, the loudspeakers Q01 to Q15 may highlight sound effects or voices in a specific display region. In this way, the multimedia system 100 may enhance sound source synchronization effect.

In an embodiment, the signal encoder 110 may be an encoding device in the multimedia system 100. The signal encoder 110 operates in an editing phase of the multimedia signal SMU. In an embodiment, the screen 120, the loudspeakers Q01 to Q15, the processor 130, and the amplifier circuit 140 may be a combination of multimedia playback devices in the multimedia system 100.

In an embodiment, the screen 120 may be a screen of a display device providing display functions such as a liquid crystal display (LCD), a light-emitting diode (LED), an organic light-emitting diode (OLED), and the like. The processor 130 is, for example, a central processing unit (CPU) or other programmable general-purpose or special-purpose microprocessors, a digital signal processor (DSP), a programmable controller, an application specific integrated circuit (ASIC), a programmable logic device (PLD), other similar devices, or a combination of these devices that may load and execute computer programs.

Figure 2:
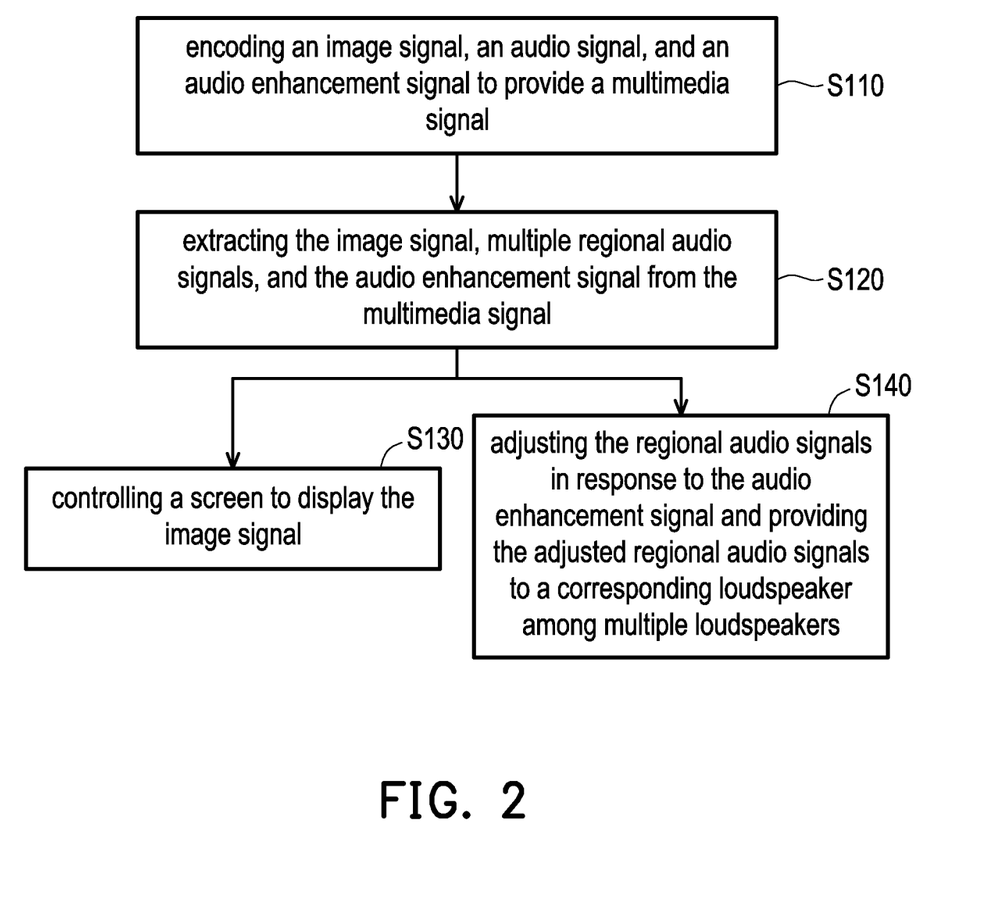
FIG. 2 is an operation flow chart of a multimedia operation method according to an embodiment of the disclosure.

Please refer to FIG. 1 and FIG. 2. FIG. 2 is an operation flow chart of a multimedia operation method according to an embodiment of the disclosure. In an embodiment, the multimedia operation method is adapted for the multimedia system 100. In step S110, the image signal SIMG, the audio signal SV, and the audio enhancement signal SVE are encoded to provide the multimedia signal SMU. In step S120, the image signal SIMG, the regional audio signals SGV01 to SGV15, and the audio enhancement signal SVE are extracted from the multimedia signal SMU. In step S130, the control screen 120 displays the image signal SIMG. In addition, in step S140, the regional audio signals SGV01 to SGV15 are adjusted in response to the audio enhancement signal SVE to generate the adjusted regional audio signals SGV01' to SGV15', and the adjusted regional audio signals SGV01' to SGV15' are provided to corresponding ones among the loudspeakers Q01 to Q15. Implementation details of steps S110 to S140 may be sufficiently taught from the embodiment of FIG. 1, and thus details thereof are not described herein.

Figure 3:
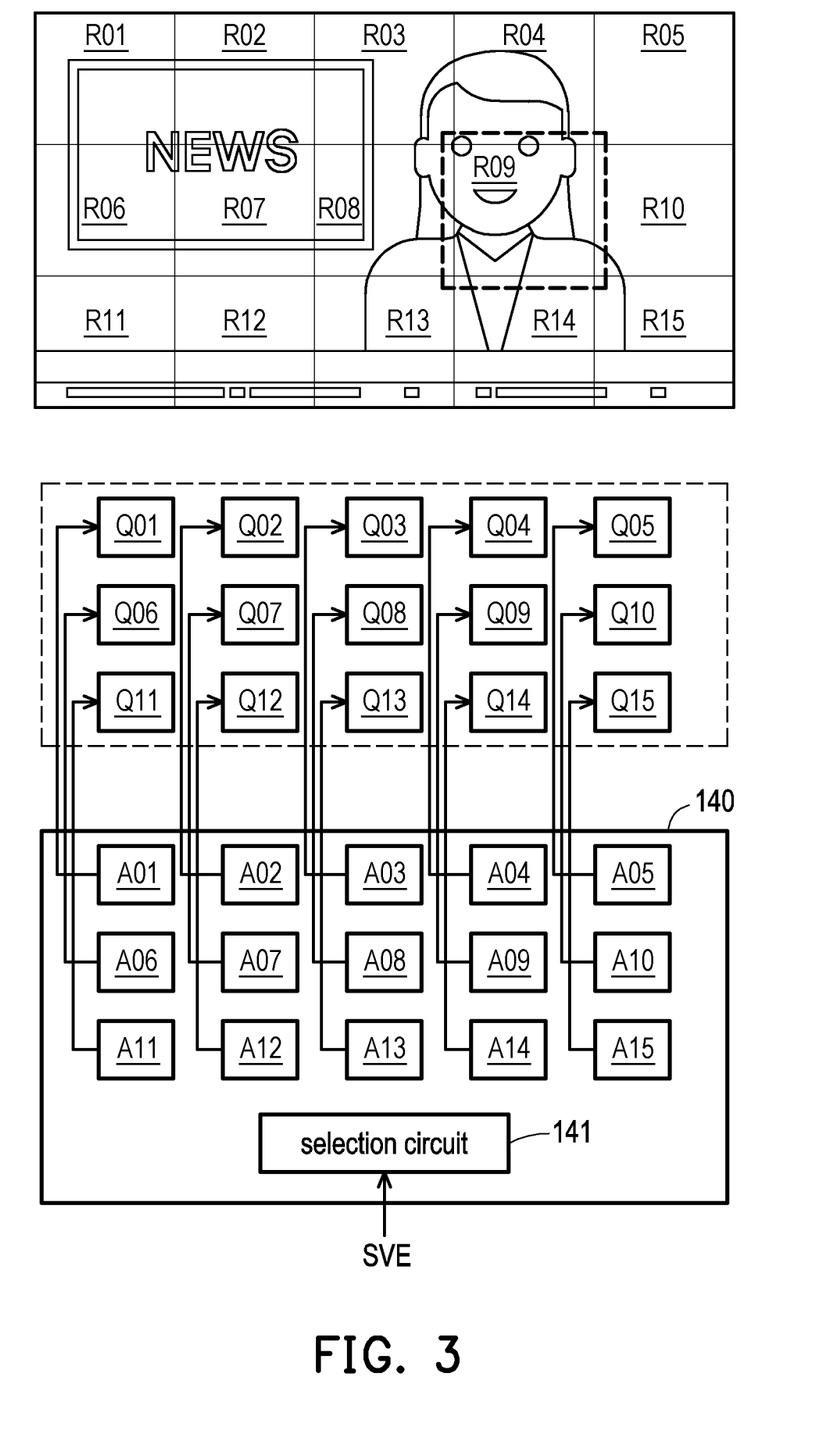
FIG. 3 is a schematic diagram of a scenario of a multimedia system according to an embodiment of the disclosure.

Please refer to FIG. 1 and FIG. 3 together. FIG. 3 is a schematic diagram of a scenario of a multimedia system according to an embodiment of the disclosure. In an embodiment, during a time interval in the editing phase of the multimedia signal SMU, the image signal SIMG is known to include an image of an object of interest making sounds in the display region R09. The image in the display region R09 is, for example, a news anchor reporting news. Therefore, the audio enhancement signal SVE may be set to highlight voices or sound effects in the display region R09.

In a playback phase of the multimedia signal SMU, the amplifier circuit 140 selects the regional audio signal SGV09 corresponding to the display region R09 in response to the audio enhancement signal SVE. The amplifier circuit 140 adjusts the regional audio signals SGV01 to SGV15 and adjusts the strength of the regional audio signal SGV09 to be greater than the strengths of the regional audio signals SGV01 to SGV08 and SGV10 to SGV15 other than the regional audio signal SGV09. In other words, based on the audio enhancement signal SVE, the amplifier circuit 140 renders the strength of the adjusted regional audio signal SGV09' greater than the strengths of the adjusted regional audio signals SGV01' to SGV08' and SGV10' to SGV15'. The volume of the adjusted regional audio signal SGV09' played by the loudspeaker Q09 is greater than the volume played by the loudspeakers Q01 to Q08 and Q10 to Q15. Therefore, the sounds made by the object of interest corresponding to the display region R09 may be highlighted. In addition, the arrangement of the loudspeakers Q01 to Q15 corresponds to the arrangement of the display regions R01 to R15, which means the number of the loudspeakers Q01 to Q15 is the same as the number of the display regions R01 to R15, but the disclosure is not limited thereto. Taking an embodiment as an example, the arrangement of the loudspeakers Q01 to Q15 is the same as the arrangement of the display regions R01 to R15. Therefore, this embodiment may effectively improve the sound source synchronization effect.

In an embodiment, the amplifier circuit 140 includes amplifiers A01 to A15 and a selection circuit 141. The amplifiers A01 to A15 are correspondingly coupled to the loudspeakers Q01 to Q15, which means the number of the amplifiers A01 to A15 is the same as the number of the loudspeakers Q01 to Q15, but the disclosure is not limited thereto. The amplifiers A01 to A15 respectively receive the corresponding ones among the regional audio signals SGV01 to SGV15 and perform gain adjustment on the corresponding regional audio signals. For example, the amplifier A01 is coupled to the loudspeaker Q01. The amplifier A01 receives the regional audio signal SGV01 and performs gain adjustment on the regional audio signal SGV01 to generate the adjusted regional audio signal SGV01'. The amplifier A02 is coupled to the loudspeaker Q02. The amplifier A02 receives the regional audio signal SGV02 and performs gain adjustment on the regional audio signal SGV02 to generate the adjusted regional audio signal SGV02', and so on.

The selection circuit 141 is coupled to the amplifiers A01 to A15. The selection circuit 141 selects a first amplifier among the amplifiers A01 to A15 in response to the audio enhancement signal SVE. The amplifier circuit 140 renders a first gain generated by the first amplifier greater than a second gain of at least one second amplifier other than the first amplifier. Taking a scenario in an embodiment as an example, the selection circuit 141 selects the amplifier A09 as the first amplifier in response to the audio enhancement signal SVE. Therefore, the amplifiers A01 to A08 and A10 to A15 are used as the second amplifiers. The amplifiers A01 to A08 and A10 to A15 reduce the second gain in response to the audio enhancement signal SVE. The amplifier A09 maintains the first gain in response to the audio enhancement signal SVE. Therefore, the volume of the adjusted regional audio signal SGV09' is highlighted.

It should be noted that the amplifiers A01 to A08 and A10 to A15 reduce the second gain in response to the audio enhancement signal SVE. The amplifier A09 maintains the first gain in response to the audio enhancement signal SVE. Therefore, the adjusted regional audio signals SGV01' to SGV15' provided by the loudspeakers Q01 to Q15 do not cause too much burden on a user's ears. In some embodiments, the amplifier A09 may increase the first gain in response to the audio enhancement signal SVE.

Figure 4:
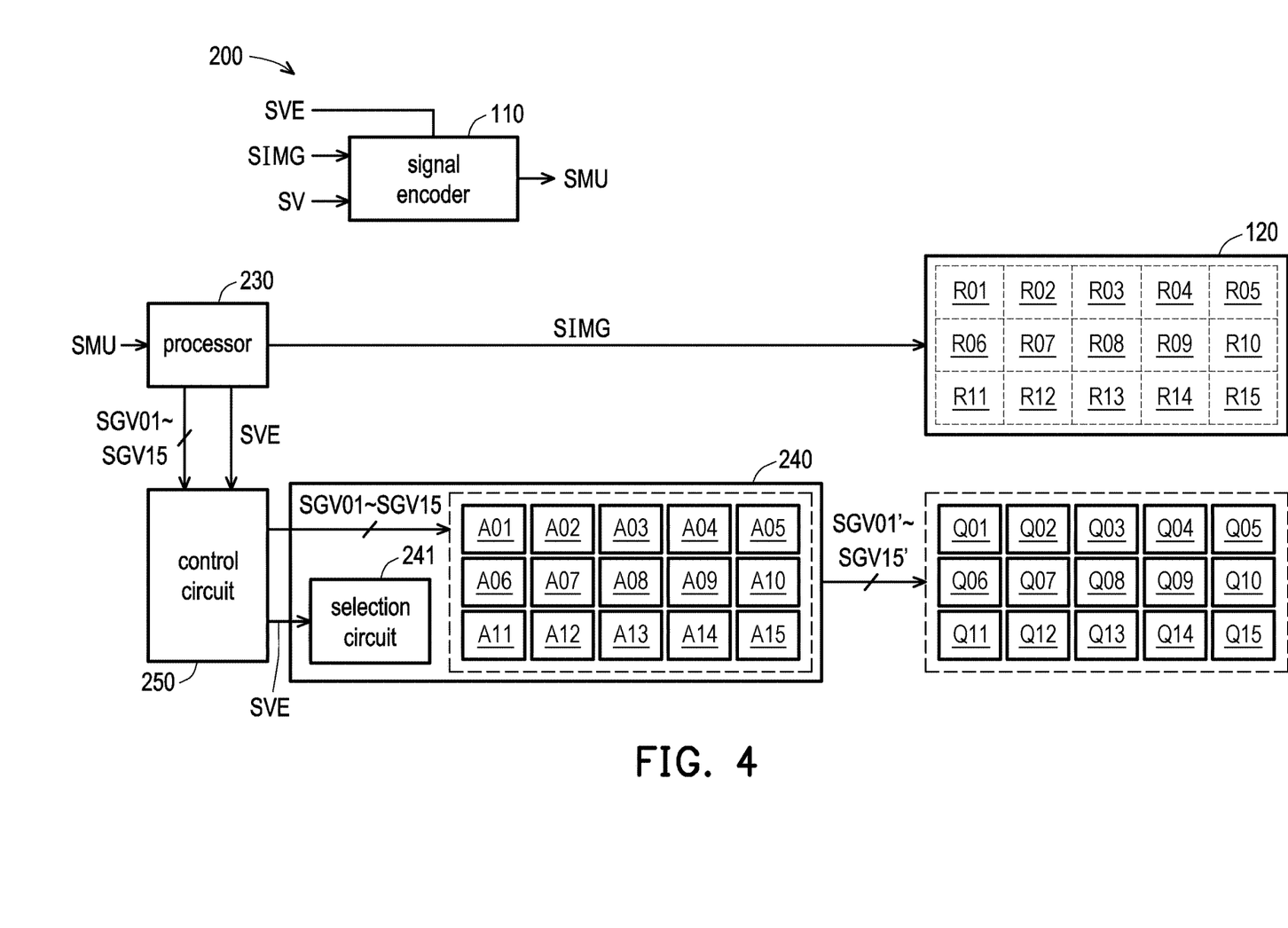
FIG. 4 is a schematic diagram of a multimedia system according to an embodiment of the disclosure.

Please refer to FIG. 4. FIG. 4 is a schematic diagram of a multimedia system according to an embodiment of the disclosure. In an embodiment, the multimedia system 100 includes the signal encoder 110, the screen 120, the loudspeakers Q01 to Q15, a processor 230, an amplifier circuit 240, and a control circuit 250. The amplifier circuit 240 includes the amplifiers A01 to A15 and a selection circuit 241. Implementation of the signal encoder 110, the screen 120, and the loudspeakers Q01 to Q15 may be sufficiently taught from multiple embodiments of FIG. 1 to FIG. 3, and thus details thereof are not described herein. In an embodiment, the control circuit 250 is coupled to the processor 230, the signal encoder 110, and the amplifier circuit 240. The processor 230 receives the multimedia signal SMU. The processor 230 extracts the image signal SIMG, the regional audio signals SGV01 to SGV15, and the audio enhancement signal SVE from the multimedia signal SMU. The processor 230 provides the image signal SIMG to the screen 120. The processor 230 provides the regional audio signals SGV01 to SGV15 and the audio enhancement signal SVE to the control circuit 250. The audio enhancement signal SVE includes multiple region codes corresponding to the display regions R01 to R15. Therefore, the control circuit 250 receives the regional audio signals SGV01 to SGV15 and respectively transmits the regional audio signals SGV01 to SGV15 to the corresponding amplifiers among the amplifiers A01 to A15. For example, the regional audio signal SGV01 includes the region code for indicating the display region R01, the regional audio signal SGV02 includes the region code for indicating the display region R02, and so on. Therefore, the control circuit 250 provides the regional audio signal SGV01 to the amplifier A01 in response to the region code of the regional audio signal SGV01, the control circuit 250 provides the regional audio signal SGV02 to the amplifier A02 in response to the region code of the regional audio signal SGV02, and so on.

In an embodiment, the control circuit 250 further provides the audio enhancement signal SVE to the selection circuit 241. The selection circuit 241 selects the first amplifier and the second amplifier among the amplifiers A01 to A15 in response to the audio enhancement signal SVE.

Figure 5:
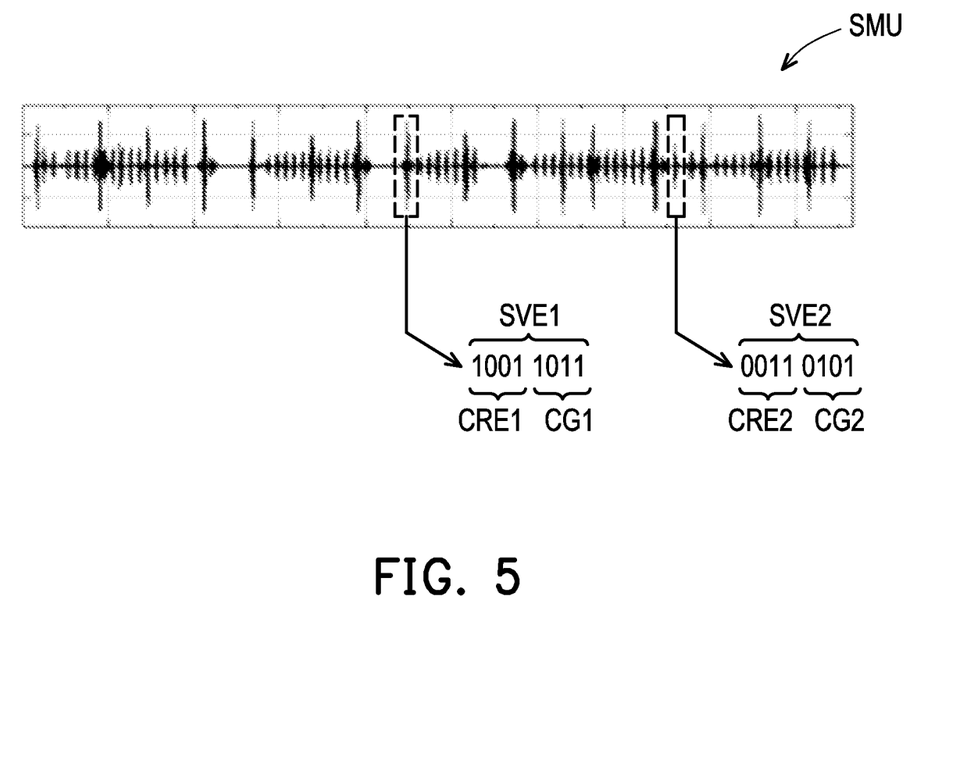
FIG. 5 is a schematic diagram of a multimedia signal according to an embodiment of the disclosure.

Please refer to FIG. 4 and FIG. 5 together. FIG. 5 is a schematic diagram of a multimedia signal according to an embodiment of the disclosure. In an embodiment, the multimedia signal SMU at least includes audio enhancement signals SVE1 and SVE2. The audio enhancement signal SVE1 includes an enhancement region code CRE1. The selection circuit 241 selects the first amplifier and the second amplifier according to the enhancement region code CRE1. In an embodiment, the enhancement region code CRE1 is denoted as "1001". Therefore, the selection circuit 241 uses the amplifier A09 as the first amplifier and uses the amplifiers A01 to A08 and A10 to A15 as the second amplifiers. In addition, the audio enhancement signal SVE1 further includes a gain code CG1 corresponding to the enhancement region code CRE1. In an embodiment, the gain code CG1 is denoted as "1011". Therefore, the amplifier A09 adjusts the first gain in response to the value of the gain code CG1. For example, the amplifier A09 increases the first gain by 13 db from an initial value in response to the value of the gain code CG1.

In an embodiment, based on the coding method, multiple bits of the gain code CG1 is lower than multiple bits of the enhancement region code CRE1, but the disclosure is not limited thereto. In some embodiments, based on different coding methods, multiple bits of the gain code CG1 is higher than multiple bits of the enhancement region code CRE1.

In an embodiment, the audio enhancement signal SVE2 includes an enhancement region code CRE2 and a gain code CG2. The enhancement region code CRE2 is denoted as "0011". The gain code CG2 is denoted as "0101". Therefore, the amplifier A03 increases the first gain by 6 db from the initial value.

For convenience of description, the enhancement region codes CRE1, CRE2 and the gain codes CG1, CG2 of an embodiment are respectively exemplified by 4 bits. Alternatively, the enhancement region codes CRE1, CRE2 and the gain codes CG1, CG2 may be respectively denoted by binary values, but the disclosure is not limited thereto. The number of bits of the enhancement region codes CRE1 and CRE2 may be adjusted based on the number of the display regions. For example, if the number of the displayed regions is 64, the enhancement region codes CRE1 and CRE2 respectively include 6 bits. In addition, the number of bits of the gain codes CG1 and CG2 may also be adjusted based on the order of gain.

In an embodiment, the audio enhancement signals SVE1 and SVE2 further include header codes. Therefore, the processor 230 may identify the audio enhancement signal SVE1 and SVE2 in the multimedia signal SMU based on the header codes of the audio enhancement signals SVE1 and SVE2 and may extract the audio enhancement signals SVE1 and SVE2.

Figure 6:
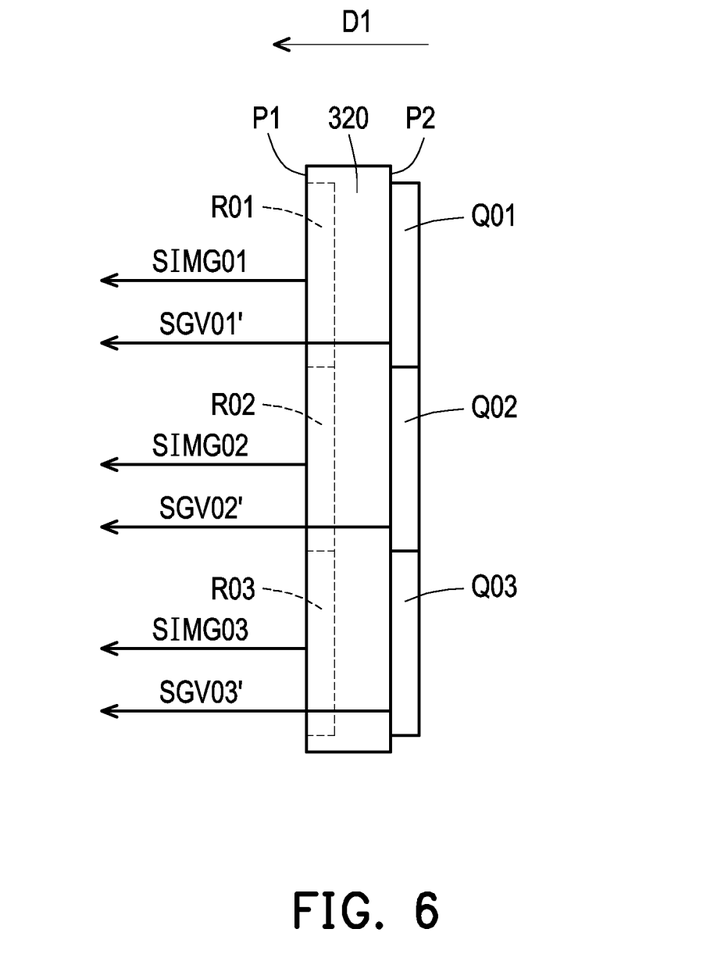
FIG. 6 is a schematic configuration diagram of a screen and loudspeakers according to an embodiment of the disclosure.

Please refer to FIG. 6. FIG. 6 is a schematic configuration diagram of a screen and loudspeakers according to an embodiment of the disclosure. FIG. 6 illustrates part of a screen 320 and part of the loudspeakers Q01 to Q03. In an embodiment, the arrangement of the loudspeakers Q01 to Q03 corresponds to the arrangement of the display regions R01 to R03 on a first plane P1 of the screen 320. Specifically, the loudspeaker Q01 corresponds to the display region R01. The loudspeaker Q01 and the display region R01 are arranged along a direction D1. The loudspeaker Q02 corresponds to the display region R02. The loudspeaker Q02 and the display region R02 are arranged along the direction D1. The loudspeaker Q03 corresponds to the display region R03. The loudspeaker Q03 and the display region R03 are arranged along the direction D1.

In an embodiment, the loudspeakers Q01 to Q03 are respectively electrostatic loudspeakers. In other words, the loudspeakers Q01 to Q03 are implemented by at least one part of an electrostatic loudspeaker array. The first surface P1 of the screen 320 is a display surface. The screen 320 uses the first plane P1 to display the regional image signals SIMG01 to SIMG03 toward a display direction. The display direction is substantially equal to the direction D1. The speakers Q01 to Q03 are disposed on a second plane P2 of the screen 320. The second plane P2 is relative to the first plane P1. The loudspeakers Q01 to Q03 play the adjusted regional audio signals SGV01' to SGV03' toward the display direction.

It should be noted that an electrostatic loudspeaker has extremely high output directivity of an audio signal. Therefore, the loudspeakers Q01 to Q03 may be allowed to be disposed on the second plane P2 of the screen 320, and the loudspeakers Q01 to Q03 respectively play the adjusted regional audio signals SGV01' to SGV03' toward the display direction. The adjusted regional audio signals SGV01' to SGV03' may penetrate the screen 320 and be transmitted to the user. In this way, the embodiment may further improve the sound source synchronization effect, thereby enhancing the user's viewing experience.

In summary, the multimedia system and the multimedia operation method add the audio enhancement signal to the multimedia signal. The amplifier circuit may adjust the regional audio signals in response to the audio enhancement signal and correspondingly provide the adjusted regional audio signals to multiple loudspeakers. Therefore, the loudspeakers may highlight sound effects or voices in a specific display region. In this way, the multimedia system and the multimedia operation method may improve the sound source synchronization effect. Moreover, the loudspeakers are respectively implemented by electrostatic loudspeakers, which have extremely high output directivity of an audio signal. Therefore, the adjusted regional audio signals may penetrate the screen and be transmitted to the user. In this way, the sound source synchronization effect may be further improved, thereby enhancing the user's viewing experience.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A multimedia system, comprising:
a signal encoder, configured to encode an image signal, an audio signal, and an audio enhancement signal to provide a multimedia signal, wherein the image signal is divided into a plurality of regional image signals based on a plurality of display regions, wherein the audio signal comprises a plurality of regional audio signals corresponding to the plurality of regional image signals;
a screen, having the plurality of display regions;
a plurality of loudspeakers;
a processor, coupled to the screen and configured to extract the image signal, the plurality of regional audio signals, and the audio enhancement signal from the multimedia signal and control the screen to display the image signal; and
an amplifier circuit, coupled to the processor and the plurality of loudspeakers and configured to receive the plurality of regional audio signals and the audio enhancement signal, adjust the plurality of regional audio signals in response to the audio enhancement signal, and provide the plurality of regional audio signals that are adjusted to corresponding ones among the plurality of loudspeakers,
wherein the amplifier circuit comprises:
a plurality of amplifiers, correspondingly coupled to the plurality of loudspeakers,
wherein the amplifier circuit renders a first gain generated by a first amplifier greater than a second gain of at least one second amplifier,
wherein the audio enhancement signal comprises an enhancement region code and a gain code corresponding to the enhancement region code,
wherein the first amplifier is selected by the enhancement region code, and
wherein the first amplifier increases the first gain by a code value of the gain code.

2. The multimedia system according to claim 1, wherein the amplifier circuit selects a first regional audio signal of a corresponding display region among the plurality of display regions in response to the audio enhancement signal and adjusts a strength of the first regional audio signal to be greater than a strength of at least one second regional audio signal other than the first regional audio signal.

3. The multimedia system according to claim 2, wherein the amplifier circuit further comprises:
a selection circuit, coupled to the plurality of amplifiers and configured to select the first amplifier and the at least one second amplifier other than the first amplifier among the plurality of amplifiers in response to the audio enhancement signal.

4. The multimedia system according to claim 3, wherein the at least one second amplifier reduces the second gain in response to the audio enhancement signal.

5. The multimedia system according to claim 3, wherein the first amplifier increases the first gain in response to the audio enhancement signal.

6. The multimedia system according to claim 3, further comprising:
a control circuit, coupled to the processor and the amplifier circuit and configured to receive the plurality of regional audio signals and respectively transmit the plurality of regional audio signals to corresponding amplifiers among the plurality of amplifiers.

7. The multimedia system according to claim 3, wherein:
the selection circuit selects the first amplifier and the at least one second amplifier according to the enhancement region code.

8. The multimedia system according to claim 1, wherein an arrangement of the plurality of loudspeakers corresponds to an arrangement of the plurality of display regions.

9. The multimedia system according to claim 1, wherein the plurality of loudspeakers are implemented by an electrostatic loudspeaker array.

10. The multimedia system according to claim 9, wherein:
a first plane of the screen is used to display the image signal toward a display direction,
the plurality of loudspeakers are disposed on a second plane of the screen and play the plurality of regional audio signals that are adjusted toward the display direction, and
the first plane is relative to the second plane.

11. A multimedia operation method for a multimedia system, wherein the multimedia system comprises a screen and a plurality of loudspeakers, the multimedia operation method comprising:
encoding an image signal, an audio signal, and an audio enhancement signal to provide a multimedia signal, wherein the image signal is divided into a plurality of regional image signals based on a plurality of display regions of the screen, wherein the audio signal comprises a plurality of regional audio signals corresponding to the plurality of regional image signals, wherein the audio enhancement signal comprises an enhancement region code and a gain code corresponding to the enhancement region code;
extracting the image signal, the plurality of regional audio signals, and the audio enhancement signal from the multimedia signal;
controlling the screen to display the image signal;
adjusting the plurality of regional audio signals in response to the audio enhancement signal by an amplifier circuit and providing the plurality of regional audio signals that are adjusted to corresponding ones among the plurality of loudspeakers, wherein the amplifier circuit comprises a plurality of amplifiers, and the plurality of amplifiers are correspondingly coupled to the plurality of loudspeakers, wherein the amplifier circuit renders a first gain generated by a first amplifier greater than a second gain of at least one second amplifier;
selecting the first amplifier by the enhancement region code; and
increasing the first gain of the first amplifier by a code value of the gain code.

12. The multimedia operation method according to claim 11, wherein the step of adjusting the plurality of regional audio signals in response to the audio enhancement signal comprising:
selecting a first regional audio signal of a corresponding display region among the plurality of display regions in response to the audio enhancement signal; and
adjusting a strength of the first regional audio signal to be greater than a strength of at least one second regional audio signal other than the first regional audio signal.

13. The multimedia operation method according to claim 11, wherein the step of adjusting the plurality of regional audio signals in response to the audio enhancement signal comprises:
receiving a corresponding regional audio signal among the plurality of regional audio signals and performing gain adjustment on the corresponding regional audio signal by the plurality of amplifiers; and
selecting a first amplifier and at least one second amplifier other than the first amplifier among the plurality of amplifiers in response to the audio enhancement signal.

14. The multimedia operation method according to claim 13, wherein the step of rendering the first gain generated by the first amplifier greater than the second gain of the at least one second amplifier comprises:
decreasing the second gain in response to the audio enhancement signal.

15. The multimedia operation method according to claim 13, wherein the step of rendering the first gain generated by the first amplifier greater than the second gain of the at least one second amplifier comprises:
increasing the first gain in response to the audio enhancement signal.

16. The multimedia operation method according to claim 11, wherein an arrangement of the plurality of loudspeakers corresponds to an arrangement of the plurality of display regions.

17. The multimedia operation method according to claim 11, wherein the plurality of loudspeakers are implemented by an electrostatic loudspeaker array.

\* \* \* \* \*